(12) United States Patent
Gutkin

(10) Patent No.: US 11,600,092 B1
(45) Date of Patent: Mar. 7, 2023

(54) SYSTEM, APPARATUS, AND METHOD TO OPTIMIZE PUBLICATION OF BIOMEDICAL RESEARCH AND TECHNICAL MANUSCRIPTS

(71) Applicant: Stephen Wayne Gutkin, Midland Park, NJ (US)

(72) Inventor: Stephen Wayne Gutkin, Midland Park, NJ (US)

(73) Assignee: Navigate Publications LLC, Midland Park, NJ (US)

( * ) Notice: Subject to any disclaimer, the term of this patent is extended or adjusted under 35 U.S.C. 154(b) by 0 days.

(21) Appl. No.: 17/247,361

(22) Filed: Dec. 9, 2020

Related U.S. Application Data

(60) Provisional application No. 62/945,341, filed on Dec. 9, 2019.

(51) Int. Cl.
| | |
|---|---|
| *G06V 30/418* | (2022.01) |
| *G06F 17/11* | (2006.01) |
| *G06F 40/166* | (2020.01) |
| *G06F 16/93* | (2019.01) |

(52) U.S. Cl.
CPC ............ *G06V 30/418* (2022.01); *G06F 16/93* (2019.01); *G06F 17/11* (2013.01); *G06F 40/166* (2020.01)

(58) Field of Classification Search
CPC ...... G06V 30/418; G06F 16/93; G06F 40/166
See application file for complete search history.

(56) References Cited

U.S. PATENT DOCUMENTS

| | | | |
|---|---|---|---|
| 6,938,021 B2 * | 8/2005 | Shear | G06Q 30/00 705/67 |
| 7,263,655 B1 | 8/2007 | Carden, Jr. | |
| 7,620,555 B1 | 11/2009 | Plotkin | |
| 8,201,085 B2 | 6/2012 | Rollins et al. | |

(Continued)

OTHER PUBLICATIONS

Gutkin, Stephen "Ripe" for Change: Introducing a New Index of Publication Efficiency RETE (Year: 2012).*

*Primary Examiner* — Stephen S Hong
*Assistant Examiner* — Nicholas Hasty
(74) *Attorney, Agent, or Firm* — Squire Patent Consulting & IP Law LLC; Brendan E. Squire

(57) ABSTRACT

A system, apparatus, method, and computer program product that enhances the efficiency and quality of matches between intellectual content generated by authors and published by peer-reviewed journals. Stable matches between works and stakeholders are modelled, in a nonbinding manner, via a stable-matching problem (Gale-Shapley) algorithm. Via bulletin-board systems acting upon deidentified data, the LONGITUDE function enables journal editors to proactively and reliably commit time and other resources to manuscripts that are most mature and otherwise meritorious. Via the SCRIMSHAW function, COMPASS assists authors in drafting and editing papers that are based on quality-control and journal author guidelines and hence more likely to be accepted by journals. Functions of COMPASS are divisible into two major domains: "matching" and "dispatching." The "matching" is fulfilled by three subfunctions: LONGITUDE, DECK WEDDING, and FATHOM. "Dispatching" is fulfilled via SCRIMSHAW, which promotes journal-ready manuscript quality via an intuitive 0 to 100% quality scoring system.

18 Claims, 7 Drawing Sheets

(56) References Cited

U.S. PATENT DOCUMENTS

| | | | |
|---|---|---|---|
| 8,676,780 B2 | 3/2014 | Rollins et al. | |
| 10,509,861 B2* | 12/2019 | Rollins | G06F 40/253 |
| 2007/0150404 A1* | 6/2007 | Golle | G06Q 50/10 |
| | | | 705/37 |
| 2008/0288324 A1 | 11/2008 | Graczynski et al. | |
| 2012/0066625 A1 | 3/2012 | Encina et al. | |
| 2013/0268524 A1 | 10/2013 | Etkin | |
| 2013/0332242 A1 | 12/2013 | Arnaout et al. | |
| 2014/0032573 A1 | 1/2014 | Etkin | |
| 2014/0058782 A1 | 2/2014 | Graves, Jr. | |
| 2014/0087354 A1* | 3/2014 | Collier | G09B 7/02 |
| | | | 434/353 |
| 2015/0193551 A1 | 7/2015 | Gordon et al. | |
| 2015/0302307 A1 | 10/2015 | Guo | |
| 2016/0005112 A1 | 1/2016 | Rogosnitzky | |
| 2016/0379299 A1* | 12/2016 | Alizadeh | G06Q 50/188 |
| | | | 705/80 |
| 2018/0165720 A1 | 6/2018 | Barkeloo | |
| 2020/0210693 A1* | 7/2020 | Scanlan | G09B 7/04 |

\* cited by examiner

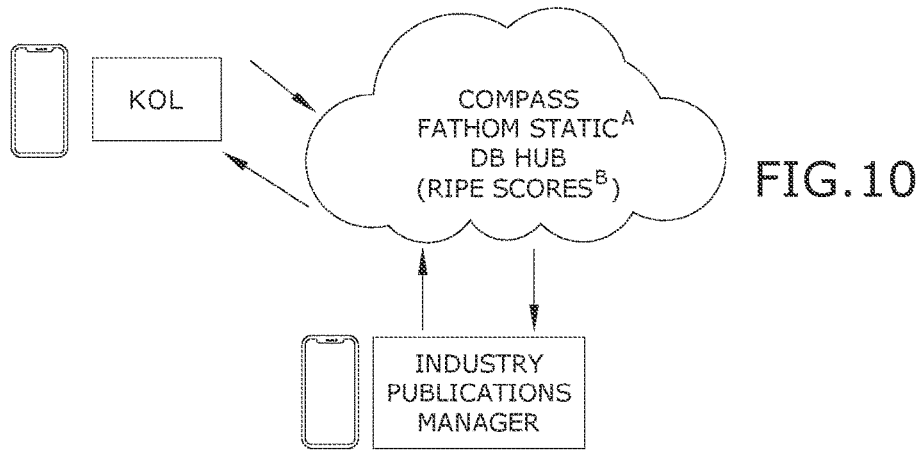
FIG.10
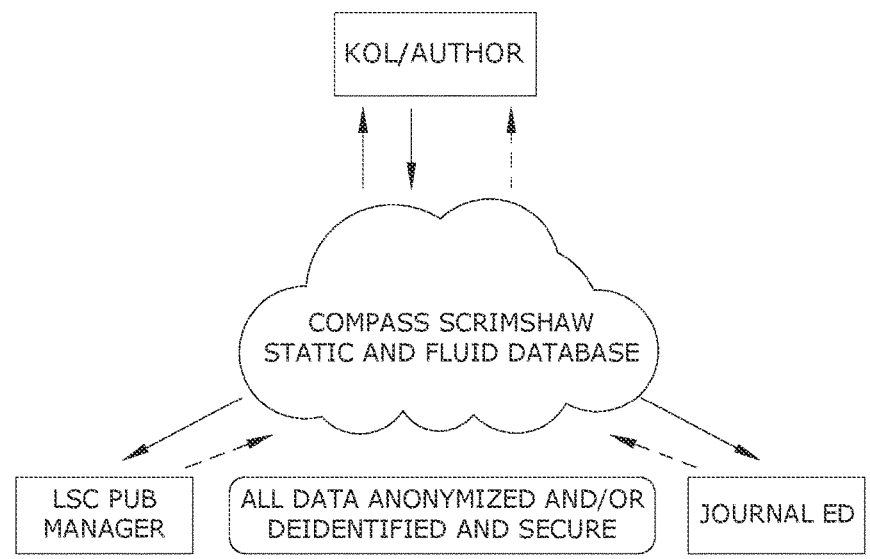
FIG.11
| 1. ENTRY | 2. TENDER/SCOUT | 3. NOM | 4. LGX | 5. ABX (#) |
|---|---|---|---|---|
| 6. GALLEY | 7. ARCH | 8. ETHX | 9. SCRIMSHANDER | 10. SEMAPHORE/SCORE |
FIG.12

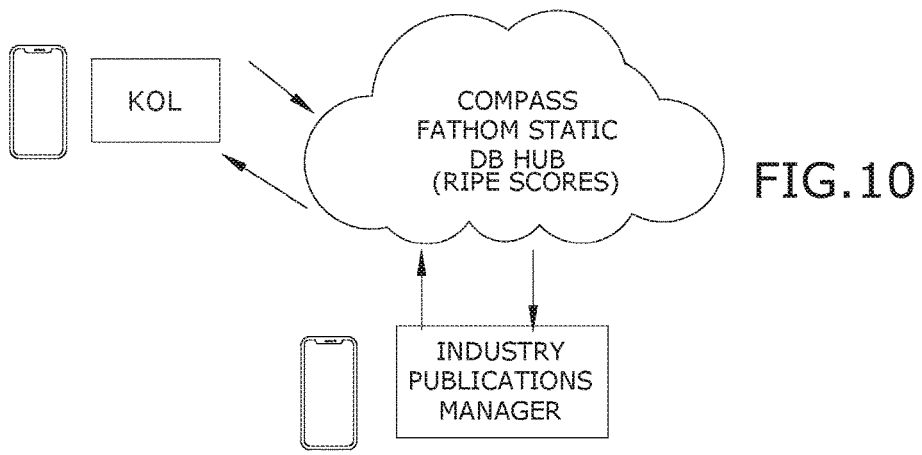
FIG.10
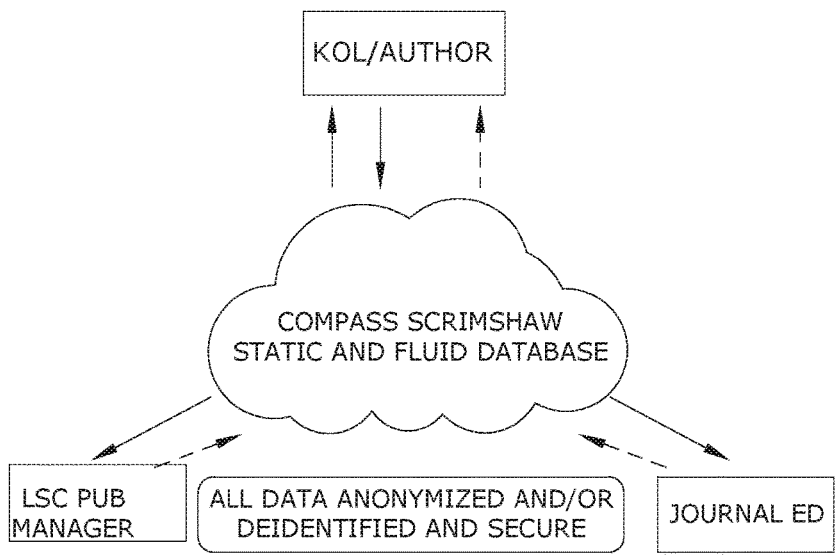
FIG.11
| 1. ENTRY | 2. TENDER/ SCOUT | 3. NOM | 4. LGX | 5. ABX (#) |
|---|---|---|---|---|
| 6. GALLEY | 7. ARCH | 8. ETHX | 9. SCRIMSHANDER | 10. SEMAPHORE/ SCORE |
FIG.12

Intensive glucose control with oral antihyperglycemic agents (OAHAs) can decrease the risk of diabetic vascular complications, according to the United Kingdom Prospective Diabetes Study (UKPDS), among others. However, a systematic literature review of 38 diabetes clinical trials found that 42% of patients with T2DM who receive OAHAs have generic health-related quality of life (HRQOL) above the population mean (50 for the SF-36).

Randomized controlled trials may overestimate HRQOL because subjects are highly "selected" for high adherence, medication tolerability, and minimal comorbidities. Conversely, observational cohort studies can provide better insight into "real-world" patient HRQOL. Equipped with data from such studies, physicians may be better able to proactively identify individuals who have decreased HRQOL and are hence at increased risk of poor adherence and other adverse health outcomes.

METHODS

SCRIMSHAW STROBE

An introduction concluded without a statement of study objectives and/or hypotheses. Please add.
STROBE QC Checklist Item 3

FIG.13

ID
SYSTEM, APPARATUS, AND METHOD TO OPTIMIZE PUBLICATION OF BIOMEDICAL RESEARCH AND TECHNICAL MANUSCRIPTS

CROSS-REFERENCE TO RELATED APPLICATION

This application claims the benefit of priority of U.S. provisional application No. 62/945,341, filed on Dec. 9, 2019, the contents of which are herein incorporated by reference.

BACKGROUND OF THE INVENTION

The present invention relates to biomedical research and publication and more particularly to matching intellectual content providers with biomedical research publishers.

Each year, life sciences (pharmaceutical, biotech, specialty pharma, device, and diagnostics) companies (LSCs) allocate billions of dollars, and authors of research papers (e.g. key opinion leaders/authors [KOLs/AUTHORS]) spend millions of hours, to publish findings in peer-reviewed journals (PRJs). Given that many prestigious journals reject ≥60% of submissions, none of the stakeholders in the process of manuscript submission and publication are achieving desired outcomes. Many researchers find the process of manuscript writing and journal submission to be unrewarding and labor intensive.

Although commercial manuscript-tracking software is widely available and utilized by stakeholders in medical publications (e.g. LSC publication managers/directors [LSC PUBLICATION MANAGERS], KOL/AUTHORS, communications agencies), there is as yet no software system that optimizes the quality of manuscripts, and mediates (real and modelled) interactions between and among KOL/AUTHORS, LSC PUBLICATION MANAGERS, and PRJ editors and publishers (JOURNAL EDS) in a more effective manner that also does not compromise confidentiality and data security. In short, COMPASS fosters the often-arduous processes of "matching" and "dispatching" research reports to the most suitable (and highest-quality/efficiency/expediency) PRJs.

Why do prestigious peer-reviewed medical journals reject ≥60% of manuscript submissions, such that KOL/AUTHORS' success rates for their manuscript submissions are less than the "play of chance" (random probability)? The answer is at least three-fold: 1) KOL/AUTHORS do not prepare manuscripts according to journal author guidelines (JAGS), Aims & Scope, and online content from the targeted journal as well as consensus quality-control (QC) guidelines related to the type of study being reported; 2) JOURNAL EDS maintain a passive, "expectant" posture to submissions, receiving all work as submitted ("all-corners") rather than more proactively and selectively seeking and committing time and resources to more mature and otherwise promising projects/submissions earlier in the manuscript-preparation process; and 3) many KOL/AUTHORS rely on an outmoded and flawed index of impact factors and other, isolated parameters that are neither intuitive nor geared toward user submission priorities (e.g. for first, second, and third submissions). Key stakeholders in medical publications need assistance in navigating increasingly "choppy (complex and arduous) waters" of matching and quality-controlling manuscripts, as well as valuing and targeting journals.

As can be seen, there is a need for improved systems, apparatus, and methods to prepare, review, select, and disseminate articles for publication for matching publication with the most appropriate peer-reviewed biomedical journals.

SUMMARY OF THE INVENTION

In one aspect of the present invention (DECK WEDDING function), a modelling method of matching a manuscript with a publisher in a nonbinding manner is disclosed. The method includes a computer having a user interface; and a program product comprising machine-readable program code for causing, when executed, the computer to perform process steps. The steps include receiving a manuscript submission from a KOL AUTHOR or LSC PUBLICATION MANAGER with one or more author needs and preferences for a target publication for the manuscript. The manuscript is anonymized and otherwise deidentified to remove identifying indicia of an identity or a source of the manuscript. A manuscript requirement is from a publisher of a journal. The manuscript requirement specifies one or more potential preferences for a desired manuscript for publication in the journal. Each of the publisher and the journal are anonymized. The manuscript submission is matched (via a nonbinding modelling function) with the manuscript requirement according to a Gale-Shapley stable-matching algorithm. This form of matching identifies a stable match between the manuscript submission's attributes and the manuscript requirements.

In some embodiments, the method includes hosting a bulletin board service (BBS) to remotely match a manuscript with a matched manuscript requirement and connect a KOL/AUTHOR with a JOURNAL ED. The BBS has an initial configuration in which each of the matched manuscript and matched journal, as well as their representatives (KOL/AUTHORS and JOURNAL EDS), remain anonymized and otherwise deidentified until peer review of a selected manuscript is completed.

In some embodiments, the method includes accessing, via the BBS, the matched manuscript by the publisher of the matched manuscript requirement. Likewise, the method may include selecting, via the BBS, the matched manuscript for the matched manuscript requirement.

In some embodiments, the method includes accessing, via the BBS, a matched publisher by the author of the matched manuscript. Via the LONGITUDE function, the method allows more proactive (blinded) communications between a JOURNAL ED and the most mature and otherwise meritorious research (publication) projects by KOL/AUTHORS.

In some embodiments, the BBS is configured to receive the manuscript requirement from the publisher.

In some embodiments, the method includes ranking the journal according to the FATHOM function Rete Index of Publication Quality (RIPQ), with data provided from public-domain sources. The RIPQ may be presented with the matching manuscript requirement in the BBS. In other embodiments, the ranking if the journal is accomplished according to a FATHOM Efficiency index, which is computed as RIPQ divided by time from submission to publication, including in the event of a previous manuscript rejection. FATHOM Efficiency may be presented with the matching manuscript requirement in the BBS. In yet another embodiment, ranking of the journal is accomplished according to a FATHOM Expediency index, which is computed as FATHOM Efficiency weighted by journal acceptance rate, including in the event of more than one prior manuscript rejection.

In some embodiments, the BBS is configured to receive the manuscript submission from the author. Via the SCRIMSHAW function, the manuscript submission may be parsed for compliance using a selected public-domain quality control (QC) consensus guideline associated with a study type reported by the manuscript submission, within the SCRIMSHAW function. The manuscript submission may be flagged with errors of commission in conforming the manuscript submission with the selected QC consensus guideline and JAGS (author guidelines). Likewise, the manuscript submission may be flagged with errors of omission in conforming the manuscript submission with the selected QC consensus guideline and JAGS.

In other embodiments, the manuscript submission is scored according to the selected QC consensus guideline.

In yet other embodiments (SCRIMSHAW function), the method includes assessing and scoring the internal consistency (precision) for each instance of a unique numerical data element or other fact within the manuscript submission. A divergence of the unique numerical data element between a plurality of sections of the manuscript submission is flagged in the manuscript submission. The plurality of sections of the manuscript submission are selected from the group consisting of an abstract, body (Results text narrative), as well as a series of tables, figures, and appendices.

These and other features, aspects and advantages of the present invention will become better understood with reference to the following drawings, description, and claims.

BRIEF DESCRIPTION OF THE DRAWINGS

FIG. 10 is a flow diagram illustrating a FATHOM quality ranking system driven by needs for either "quality," "efficiency," or "expediency."

FIG. 11 is a flow diagram illustrating the SCRIMSHAW electronic editorial assistant, which can provide real-time or retroactive feedback by JOURNAL EDS and LSC PUBLICATION MANAGERS and KOL/AUTHORS.

FIG. 12 is a block diagram depicting subfunctions of SCRIMSHAW.

FIG. 13 illustrates a SCRIMSHAW Strengthening the Reporting of Observational Studies (STROBE) flagging of a manuscript.

DETAILED DESCRIPTION OF THE INVENTION

Figure 1:
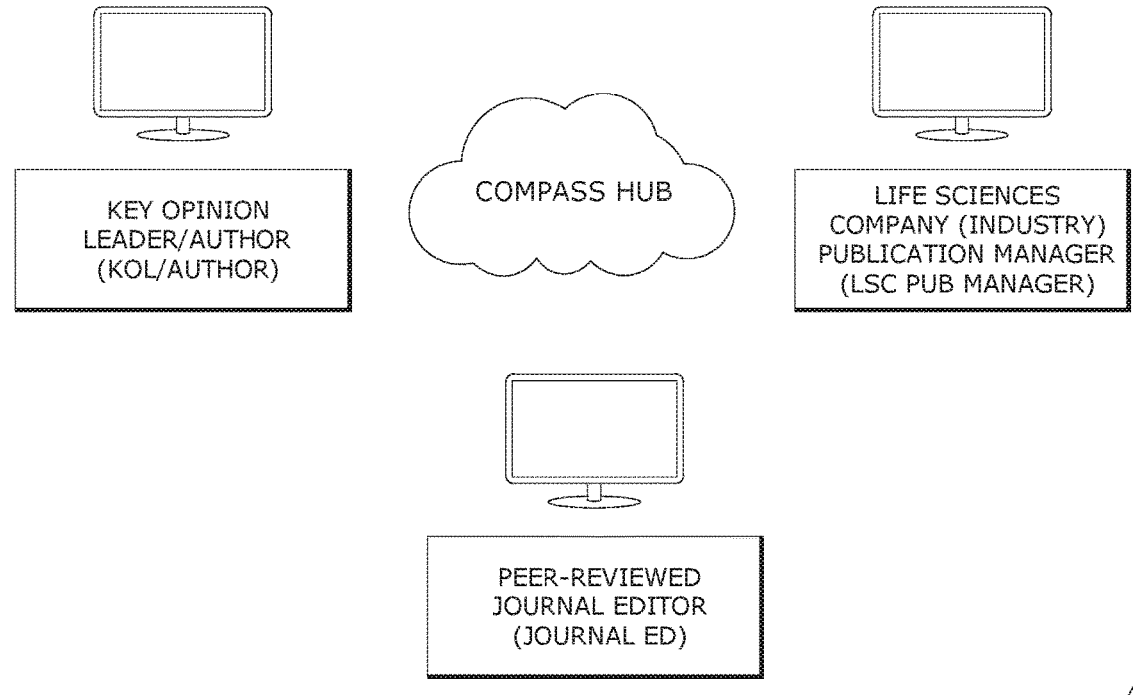
FIG. 1 provides a schematic block diagram of COMPASS stakeholders and subscribers.
Figure 2:
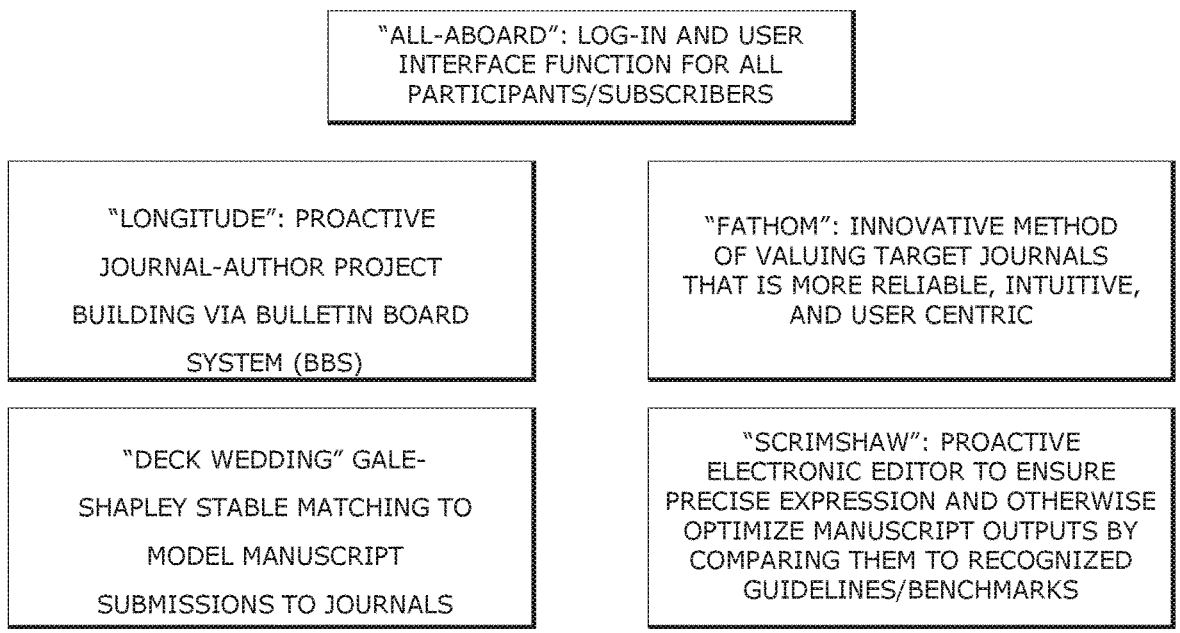
FIG. 2 is a block diagram depicting functions of the COMPASS platform.
Figure 3:
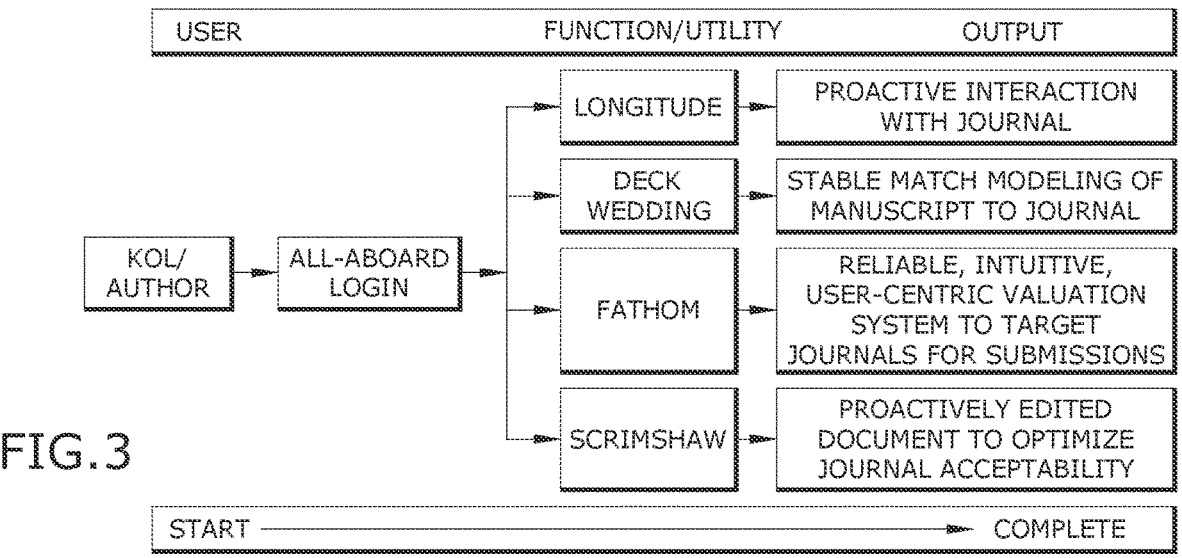
FIG. 3 is a flowchart illustrating a key opinion leader/author stakeholder process.
Figure 4:
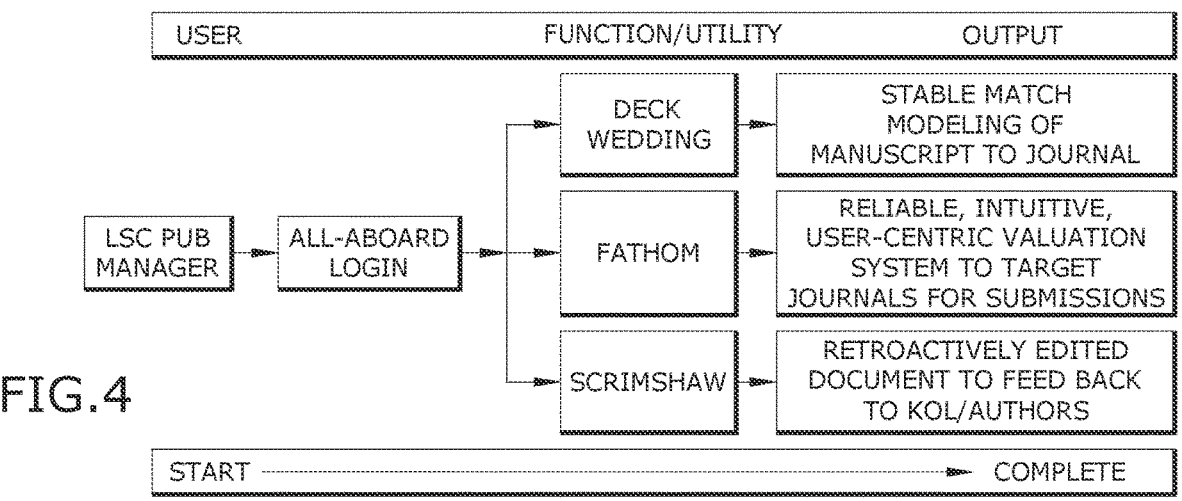
FIG. 4 is a flowchart illustrating a life sciences company publications manager stakeholder process.
Figure 5:
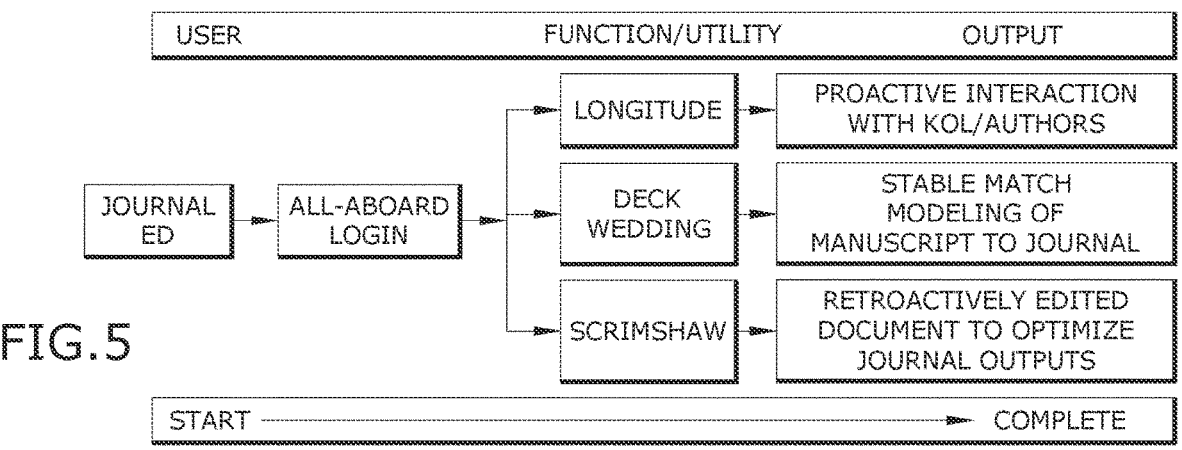
FIG. 5 is a flowchart illustrating a journal editor stakeholder process.
Figure 6:
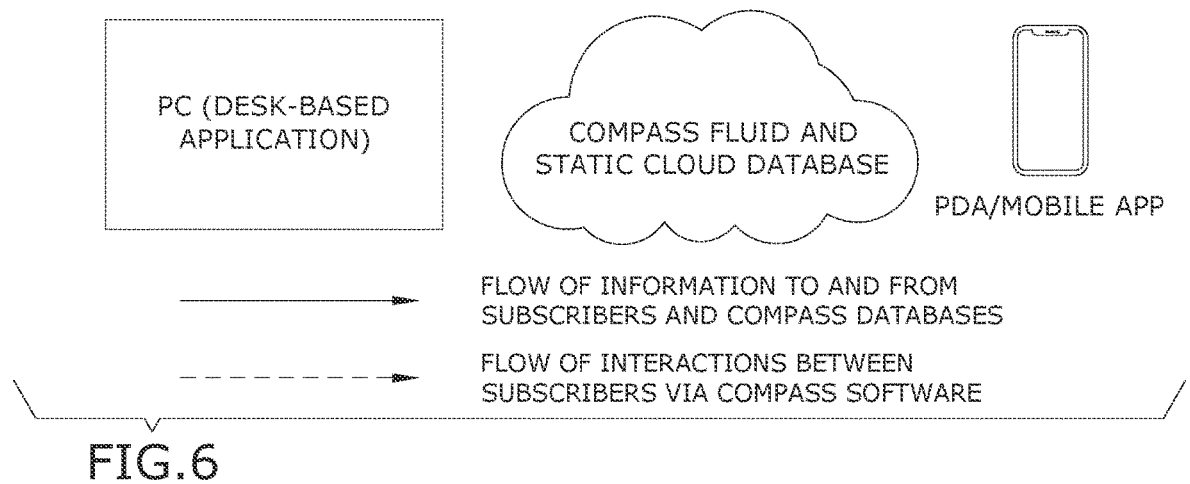
FIG. 6 is a key/legend to symbols used in FIGS. 7, 8, 10. and 11.
Figure 7:
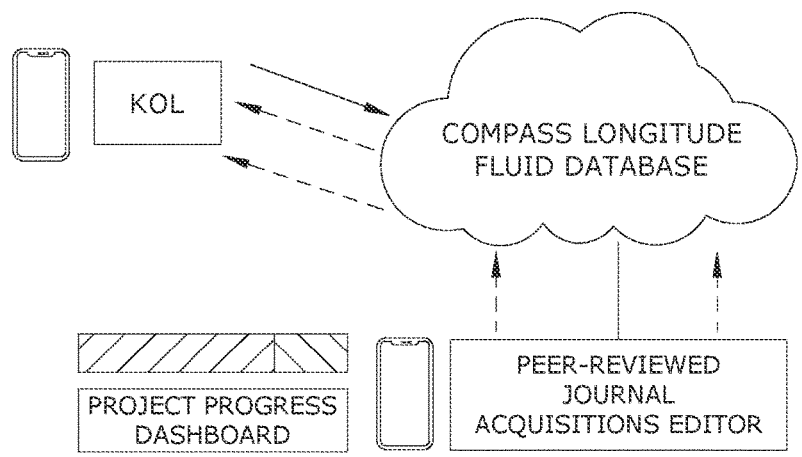
FIG. 7 is a flowchart illustrating the LONGITUDE function for research-journal matching.
Figure 8:
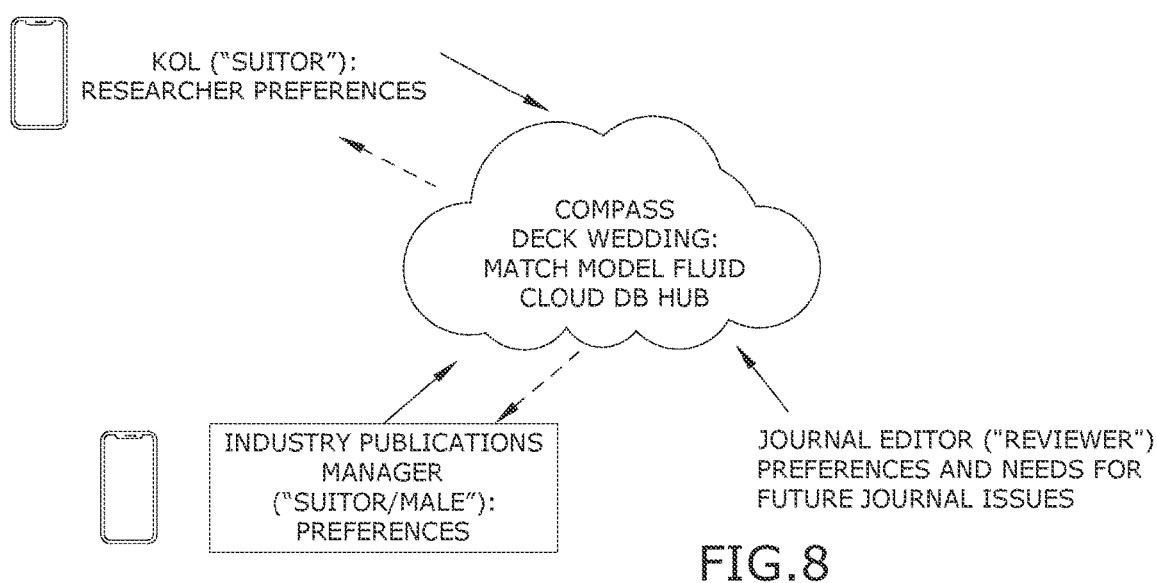
FIG. 8 is a diagram illustrating the DECK WEDDING matching/modeling function among stakeholders.

The following detailed description is of the best currently contemplated modes of carrying out exemplary embodiments of the invention. The description is not to be taken in a limiting sense but is rather made merely for the purpose of illustrating the general principles of the invention, because the scope of the invention is best defined by the appended claims.

Broadly, aspects of the present invention include a system, method, and apparatus that provides an individual and enterprise innovation, hereinafter COMPASS, to optimize publication of biomedical research study reports.

COMPASS is designed to achieve a higher benchmark (>70% first-journal acceptance) by: 1) enabling JOURNAL EDS to preview (in a double-blinded manner) the progress of these teams and request presubmission inquiries or full submissions (potentially redacted/anonymized/deidentified) from the most promising projects and research teams earlier in the manuscript-development process, via the "LONGITUDE" BBS application; 2) enhancing the "match" between a manuscript and potential journal targets based on a) the Gale-Shapley stable-match (stable-marriage) algorithm, via the "DECK WEDDING" (modeling) application; and b) a ranked index of journal quality, efficiency, and expediency that more effectively values and prioritizes journals as potential submission targets in a comprehensive and user-centric manner, via the "FATHOM" application; and c) proactive/real-time assistance to KOL AUTHORS and other personnel to prepare their manuscripts according to consensus QC guidelines issued for different types of study reports, such as CONSORT for RCT, PRISMA for systematic literature reviews and meta-analyses, and STROBE for observational studies, which are increasingly informing journal decisions to accept or decline manuscript submissions, via the SCRIMSHAW application.

Functions of COMPASS are divisible into two major domains: "matching" and "dispatching." The "matching" constituent is fulfilled by three COMPASS functions: LONGITUDE, DECK WEDDING, and FATHOM. The "dispatching" component is largely fulfilled via SCRIMSHAW, which operates either proactively or retroactively to promote journal-ready manuscript quality (and facilitates JOURNAL EDS' and LSC PUBLICATION MANAGERS' feedback to KOL/AUTHORS via a highly intuitive 0 to 100% quality scoring system).

As will be appreciated, COMPASS can be enhanced by functions within other, commercially available software platforms used by LSC PUBLICATION MANAGERS and other stakeholders to promote publication planning, project management, ethical disclosure, and other forms of compliance-required documentation.

An ALL-ABOARD function allows each party to log in and upload key, chiefly redacted/anonymized/deidentified, documents. Using a DECLARATIONS PAGE of this initial function, users establish an anonymized @COMPASS email address to facilitate KOL/AUTHOR and JOURNAL ED communications, including presubmission inquiries and other expressions of interest in a project.

A LONGITUDE component assists in matching manuscript projects with potential journal publishers proactively via a BBS, helping to ensure that papers are written to a journal's requirements and that publishers receive better-targeted and overall higher-quality and hence acceptable submissions. LONGITUDE enables a more effective (proactive, precise, and accurate) matching of intellectual content from key opinion leaders/authors (KOL/AUTHORS) to its purveyors and portals: peer-reviewed biomedical journals and their editors (JOURNAL EDS). These research outputs are also often financially supported, organized, and stewarded by industry life-sciences (e.g., pharmaceutical) company publication managers (LSC PUBLICATION MANAGERS), who are otherwise omitted from other inventions in the field of biomedical communications. Subscribers include KOL/AUTHORS, LSC PUBLICATION MANAGERS, and JOURNAL EDS.

Unlike other editorially supportive software platforms, which are largely focused on either key opinion leaders/authors (KOL/AUTHOR) or the journal editors who publish their work (JOURNAL EDS), COMPASS enables more proactive and effective interactions between these (initially deidentified) parties so that resulting collaborations are more likely to meet journal and consensus-guideline quality standards, maximizing their likelihood of acceptance. By using the LONGITUDE function, JOURNAL EDs can more effectively commit to the most mature and otherwise meritorious research projects and hence, the highest-quality manuscripts for their journals, rather than take a passive approach by which they screen "all corners."

COMPASS can be applied to support varied publishing endeavors beyond medical communications, promoting research submissions and dissemination of findings and other intellectual outputs by journals and other portals (e.g. books; popular or trade magazines). The chief outputs of COMPASS include more effective researcher/publisher alliances; higher, journal-ready manuscript quality; and more effective matches of manuscripts to PRJs, including via a modeling function and a ranked journal valuation system.

The DECK WEDDING function is a matching/modeling function, which applies the Gale-Shapley "stable-marriage" algorithm to match the attributes and needs of projects by KOL/AUTHORS as well as grids/schedules of manuscripts stewarded by LSC PUBLICATION MANAGERS, with distinct sets of needs and preferences of JOURNAL EDS. The modeled matches in turn inform KOL/AUTHOR and LSC PUBLICATION MANAGER decisions concerning targets of journal submissions. These manuscripts can be thought to have unique "phenotypes" based on traits such as numbers of words, references, and graphics; needs for publication in certain journals with minimum FATHOM scores; desire to publish on an open-access or expedited basis; and time (e.g. financial quarter) projected for publication. JOURNAL EDS have their own grids of future journal issues and needs for contributions with a diverse set of needs and preferences for contributions, including types of studies and coverage of certain therapeutic areas.

In brief, the DECK WEDDING function enables indirect modeling transactions based on Nobel Prize-winning science. Namely, the Gale-Shapley stable-match (stable marriage) algorithm models the fit between anonymized/deidentified manuscripts stewarded by an LSC PUBLICATION MANAGER and one or more KOL/AUTHOR applicants ("males/suitors" in the marriage analogy) with future journal issues as stewarded by JOURNAL EDS ("females"/proposal reviewers in the marriage analogy). The match proceeds based on needs and preferences expressed by each party. The Gale-Shapley algorithm can match suitors/applicants with reviewers (manuscript with journals) even if the two data sets are of unequal size. Historical examples include matching preferences of medical school graduates (and their significant others) with a set of properties of hospital residencies, as well as preferences of internet users to internet service providers.

A FATHOM function is a novel ranking system of valuing journals that is intuitive and user centric based on the several needs of authors at first, second, and third or later submissions: quality, efficiency, and expediency, respectively. This benchmark is arguably more reliable and comprehensive than, and does not in any way depend on, the controversial and arguably flawed impact factor.

A SCRIMSHAW function is a proactive/real-time (or retroactive) electronic editorial assistant, identifying manuscript omissions and other defects based on best-practice guidelines and scoring manuscripts to assist reviewers (industry publication managers and journal editors) in feeding back to authors/medical writers. SCRIMSHAW enables real-time and retroactive feedback on KOL/AUTHORS' manuscripts from LSC PUBLICATION MANAGERS and JOURNAL EDS, in part by comparing drafts with JAGS and consensus quality-control (QC) guidance checklists in the public domain for distinct types of study reports organized by the Enhancing the Quality and Transparency of Health Research (EQUATOR; https://www.equator-network.org/). These guidelines are increasingly being recognized as quality benchmarks and driving journal decisions on manuscript disposition. SCRIMSHAW promotes sound preparation of each segment of a paper (e.g. Introduction, Methods, Results, Discussion, Acknowledgment), largely by comparing the text with appropriately loaded dictionaries/databases and also parsing and applying deterministic rules to alleviate another major defect in many published articles: inconsistency of data and language across distinct sections of a document (internal inconsistency/imprecision).

The SCRIMSHAW function can also be applied in retroactive manner to score manuscript quality from 0 (lowest) to 100 (highest); the so-called SEMAPHORE SCORE can be uploaded along with other project details during the ALL-ABOARD function (on the DECLARATIONS PAGE) and can then inform JOURNAL EDS' decisions to interact with KOL/AUTHORS via LONGITUDE.

The following terms are described for understanding within the context of the present invention:

"Matching" refers to identifying and aligning the most suitable journal for submission of a manuscript. This activity is supported by: 1) DECK WEDDING, which embodies a nonbinding modeling approach based on the open-source Gale-Shapley stable matching (or marriage) algorithm to assist KOL/AUTHORS and LSC PUBLICATION MANAGERS in selecting a suitable journal for a particular work with a discrete set of attributes and publication needs; 2) LONGITUDE, a bulletin board system (BBS) that enables more proactive interactions between KOL/AUTHORS and JOURNAL EDS; and 3) FATHOM, an intuitive, user-centric, ranked system of valuing and targeting journals that is more intuitive and arguably more reliable compared to impact factor and is informed by the user perspective and manuscript status (e.g. first, second, or third or later submission).

"Dispatching" refers to optimizing the quality, and journal acceptability, of a manuscript. This activity is supported by SCRIMSHAW, a manuscript checker that far exceeds a typical spell- and grammar-checking system by applying deterministic rules to "parse" a document, in part by comparing it to itself (e.g. via the "SCOUT" subfunction) for internal consistency ("precision"), in that a fact or datum is expressed the same way across different parts of the manuscript); and external consistency ("accuracy"), in that the manuscript is structured consistently with JAGS and other dictionaries and libraries loaded based on the type of study and the corresponding consensus guidelines for manuscript preparation, such as Consolidated Standards of Reporting Trials (CONSORT) for randomized controlled trials (RCTs).

The following sections elucidate the COMPASS functions in further detail.

I. All-Aboard" (Log-In/All-User Interface)

To assist the BBS matching applications of COMPASS, each user (KOL/AUTHORS, LSC PUBLICATION MANAGERS, and JOURNAL EDS) interface with the "ALL-ABOARD" (log-in) application, a secure space within the system in which each party establishes an anonymized/ deidentified (no personal, identifying names of users or institutions) @COMPASS e-mail address and uploads curriculum vitae (CVs) and/or describes other qualifications.

Other stakeholders, including KOL/AUTHORS and LSC PUBLICATION MANAGERS, can also log in redacted/anonymized/deidentified abstracts, posters, and presubmission inquiries, as well as the status of a manuscript project in terms of progress toward submitting it to a journal. In a deidentified manner, JOURNAL EDS "open their books," in order to enter general (anonymized/deidentified) preferences for certain types of articles (e.g. reports of clinical trials for a particular disease or studies comparing two approved treatments) and specific needs and preferences for types of papers on particular topics in order to fill openings in future journal issues. For instance, a multispecialty journal may be planning two future issues including 12 articles each on oncology and diabetes. Each participant selects/designates a deidentified@COMPASS e-mail address and user ID that does not include any parts of their own or their journal's name.

Interface instructions guide anonymization/deidentification of: 1) manuscript titles by KOLs/researchers and LSC PUBLICATION MANAGERS; and 2) journal names and articles (types and topic matters) needed/planned for future issues by JOURNAL EDS. Sensitive content is redacted/deidentified to ensure anonymity, including changing drug names to generic "NAME OF DRUG" or pharmacologic class representatives. Examples of anonymized/deidentified titles suitable for use by the LONGITUDE BBS application follow:

Before: "Adherence of patients with schizophrenia to third-generation atypical antipsychotic PANACEAX [actual drug name]: a retrospective cohort study."

After: "Adherence of patients with schizophrenia to a third-generation atypical antipsychotic: a retrospective cohort study."

Or: "Adherence of patients with schizophrenia to "NAME OF DRUG": a retrospective cohort study."

To support other COMPASS functions, including DECK WEDDING and SCRIMSHAW, it is important to specify the type of investigation/research (e.g. randomized controlled trial, observational study) being reported. Each KOL/AUTHOR earns a different CompScore based on experiences and accomplishments in their fields. These scores are computed from data provided in the ALL-ABOARD LOG-IN (DECLARATIONS PAGE) and inform interactions between themselves and JOURNAL EDS via the BBS.

The ALL ABOARD/LOG-IN user interface BBS enables users to log into their secure accounts and upload CVs, public-domain ResearchGate author index scores, congress communications, and summaries of consulting experience across therapeutic areas to establish a COMPASS Competence Score [CompScore] that informs JOURNAL EDS decisions to commit time and other resources to obtain the highest-quality and otherwise most acceptable projects by KOL/AUTHORS, blinded abstracts for presubmission inquiries, as well as de-identified publication planning lists (by LSC PUBLICATION MANAGERS) and journal preferences and future availabilities for different types of manuscripts (by JOURNAL EDS). These log-ins drive the system to load the appropriate applications and dictionaries based on the user tier and submissions.

Information is uploaded in the ALL ABOARD function (DECLARATIONS PAGE) LOG-IN application by the following users according to a plurality of user types, or tiers.

Tier 1: KOL/AUTHORS and SUPPORTIVE PERSONNEL, including contract medical writers and editors, biostatisticians, computer-graphics professionals, and presubmission peer reviewers.

Tier 1 users include KOL/AUTHORS and SUPPORTIVE PERSONNEL, who may upload (potentially de-identified)
  Curriculum Vitae
  ResearchGate Scores
  Numbers of Publications: Abstracts, Posters, Manuscripts, Book Chapters, Books, and Others
  Experience with Different Therapeutic Areas
  Experience with Different Types of Studies (and Relevant Biostatistics)

The above information enables the COMPASS software to determine a COMPASS Competence Score (CompScore) ranging from 0 (lowest competence) to 100% (highest competence). Interested JOURNAL EDS can view these scores when reviewing projects (via LONGITUDE) and deciding whether to more proactively contact researchers of a more mature or promising nature to request a presubmission inquiry from research teams.

Other uploads by Tier 1. KOL/AUTHORS and other researchers in the ALL ABOARD
User Log-in application may include:
  Blinded abstract and cover letter (for presubmission inquiry)
  Manuscript draft (de-identified per name of intervention and funding entity)
  Tag of type of study being reported (e.g. randomized controlled trial, observational study, systematic literature review, meta-analysis)
  4-5 MeSH (Medline subject heading) terms (key words)
  Manuscript status (e.g. in preparation, presubmission inquiry submitted, rejected by first or second journal)
  Percent project completion (according to standardized milestones)
  Manuscript statistics:
    a. Number of words of text
    b. Number of references
    c. Number of tables
    d. Number of figures
    e. Number of appendices
  Tier 2. LSC Publication Managers LSC PUBLICATION MANAGERS may input one or more traits, requirements, preferences, and needs for publications, including as related to time and congress or other important dates. A list of de-identified manuscript titles may be uploaded by the LSC PUBLICATION MANAGERS (e.g. no use of drug or LSC names), including key study design and other elements (e.g. "Third-generation disease-modifying antirheumatic drug [DMARD] compared to usual care with a second-generation DMARD, for rheumatoid arthritis: a phase 3 randomized controlled trial"). Other key attributes of manuscript projects that can be entered by LSC PUBLICATION MANAGERS to inform the DECK WEDDING stable match function include:
  Planned year and month (or financial quarter) to publish each manuscript title
  Type of journal (e.g. specialty vs. multispecialty)
  Therapeutic Area
  Minimum FATHOM score (0-100%) for targeted journal
  Article amenities/preferences sought and amount willing to pay (WTP) for each (e.g.), which can inform the DECK WEDDING stable match function ("suitor/male"):
    a. Open access (e.g. WTP=$3,500 per article)
    b. Rapid communication (e.g. WTP=$3,000 per article)

Type of study being reported (e.g. randomized controlled trial, observational study, systematic literature review, meta-analysis)

MeSH (Medline subject heading) terms (key words)

Manuscript status (e.g. in preparation, presubmission inquiry submitted, rejected by first or second journal)

Percentage completion of project

Manuscript statistics:
c. Number of words of abstract and body text
d. Number of references
e. Number of tables
f. Number of figures
g. Number of appendices Tier 3. Journal Eds:

JOURNAL EDS may enter one or more of the following: Journal traits, requirements, preferences, and needs/openings for future issues (all data de-identified to maintain blinding and confidentiality)

Requirements. Maximum:
  a. Number of words of abstract and body text
  b. Number of references
  c. Number of tables
  d. Number of figures
  e. Number of appendices
  f. Fee or no fee for rapid publication
  g. Fee or no fee for open access Journal traits, preferences, and needs (e.g. for multispecialty journal), to further inform the DECK WEDDING stable match function ("female/reviewer")
  a. Prioritize reports of studies comparing one therapy to another
  b. Prioritize reports of studies involving chronic diseases (disorders with high prevalence, e.g. cardiovascular disease, diabetes)
  c. Prioritize post-approval/post-marketing surveillance>phase 3>phase 2>phase 1>preclinical/in vivo/in vitro/ex vivo study designs
  d. Journal traits, preferences, and needs (including potential "theme issues"):

Manuscript draft

Type of study being reported (e.g. randomized controlled trial, observational study, systematic literature review, meta-analysis)

MeSH (Medline subject heading) terms

Publication schedule and needs:
  E.g. Open articles for issues over a given quarter or other interval per year.

A central aim of COMPASS is to improve interactions between professionals who generate (i.e. KOL/AUTHORS), steward (i.e. LSC PUBLICATION MANAGERS), and edit/publish (i.e. JOURNAL EDS) scientific content. COMPASS is intended to augment and complement, but not supplant or infringe upon, usual journal manuscript submission and peer review. These are delicate processes that rely upon a blinded system to preclude bias. Through the bulletin-board systems (BBS) employed within COMPASS, JOURNAL EDS can ascertain the broad contours of a potential research study/project report but not in a "granular" manner that compromises the overall "blind." To maintain blinded review, COMPASS ensures the anonymity of all stakeholders, including JOURNAL EDS, KOL/AUTHORS, and funding entities (e.g. LSC PUBLICATION MANAGERS) for the work being submitted before peer review until mutually acceding to remove the blind and interact openly.

In short, COMPASS is intended to enhance not only manuscript quality (via the SCRIMSHAW EDITORIAL SUITE) but also the suitability and reliability of matches of project traits, requirements, preferences, and needs between manuscripts (generated by KOL/AUTHORS and stewarded by LSC PUBLICATION MANAGERS) and PRJs (stewarded by JOURNAL EDS) via LONGITUDE and DECK WEDDING functions. The ALL ABOARD/LOG-IN user-interface function allows each stakeholder to enter matching criteria for utilization by DECK-WEDDING.

II. Longitude

LONGITUDE allows JOURNAL EDS to preview presented posters and other, redacted (blinded) previously unpublished (or public-domain) documents uploaded by KOL/AUTHORS and more proactively and selectively request presubmission inquiries from research teams with the most mature and promising projects. LONGITUDE includes a Bulletin Board System (BBS) that provides an electronic interface between KOL/AUTHORS and JOURNAL EDS. The LONGITUDE BBS allows JOURNAL EDS to review different ongoing projects and interact anonymously with KOL/AUTHORS, including requesting a blinded presubmission inquiry. LONGITUDE may be served by an open-source BBS, which allows all parties to log in securely, upload documents and other information in a de-identified manner, and communicate anonymously via @COMPASS.com addresses.

The LONGITUDE BBS enables JOURNAL EDS to 1) gain insights into manuscripts' and other projects' progress and status (including projected dates of completion), indicated by "progress bar dashboards" (based on milestone completion); 2) interact with KOL/AUTHORS via de-identified @COMPASS.come-mail addresses; and 3) more proactively request meritorious study reports. LONGITUDE serves as a "marketplace of ideas" and uses a "research progress dashboard," in order to enable JOURNAL EDS to communicate (confidentially) with and otherwise support promising research projects (by KOL/AUTHORS and SUPPORTIVE PERSONNEL).

Via the BBS, LONGITUDE promotes BBS interactions between these teams and JOURNAL EDS seeking content to fill future journal issue openings. As mentioned above, these interactions are: 1) anonymous, using deidentified @COMPASS.com addresses and 2) nonbinding on each party. Through LONGITUDE, JOURNAL EDS identify promising manuscript projects and can request that KOL/AUTHORS share a presubmission inquiry (blinded abstract; e.g. substituting "NAME OF DRUG" for actual generic/proprietary name of drug and not identifying authors or study sponsors).

The BBS coding may be in an open-source script such as phpBB. When implemented as an open-source script, the source code can be modified to meet the overall purposes of COMPASS. The phpBB runs on one or more SiteGround servers and is among the most widely used free Open Source forum tools. This powerful and multifunctional BBS features a user-friendly interface, straightforward installation and administration, and helpful tutorial and documentation. This free open-source BBS is released under a GNU General Public License.

III. Deck Wedding

The DECK WEDDING function applies the Nobel Prize-winning, Gale-Shapley stable match/marriage problem (SMP) algorithm to model journal submissions in order to more effectively match intellectual content from KOL/AUTHORS and LSC PUBLICATION MANAGERS to its purveyors and portals (JOURNAL EDS). As seen in reference to FIG. 9, the DECK WEDDING matches are characterized as either a stable or unstable match. A match is considered stable when there is no match of A and B in which both A and B would be better off individually than they are with the element to which they are currently matched.

The SMP algorithm was also used to match medical residents (and later, their spouses) to specific hospitals/institutions/internships. The SMP is solved via the Gale-Shapley algorithm, which is widely available as open-source coding (e.g. via the "R" statistical software package). A representative SMP algorithm is shown in the following public-domain information:

function stableMatching {
  Initialize all m∈H and w∈W to free while ∃free mean m who still has a woman w to propose to {
    w=first woman on m's list to whom m has not yet proposed if w is free
    (m, w) become engaged
    else some pair $(m^x,w)$ already exists if w prefers m to $m^x$
    $m^x$ becomes free (m, w) become engaged else $(m^x, w)$ remain engaged
    }
  }
}

Figure 9:
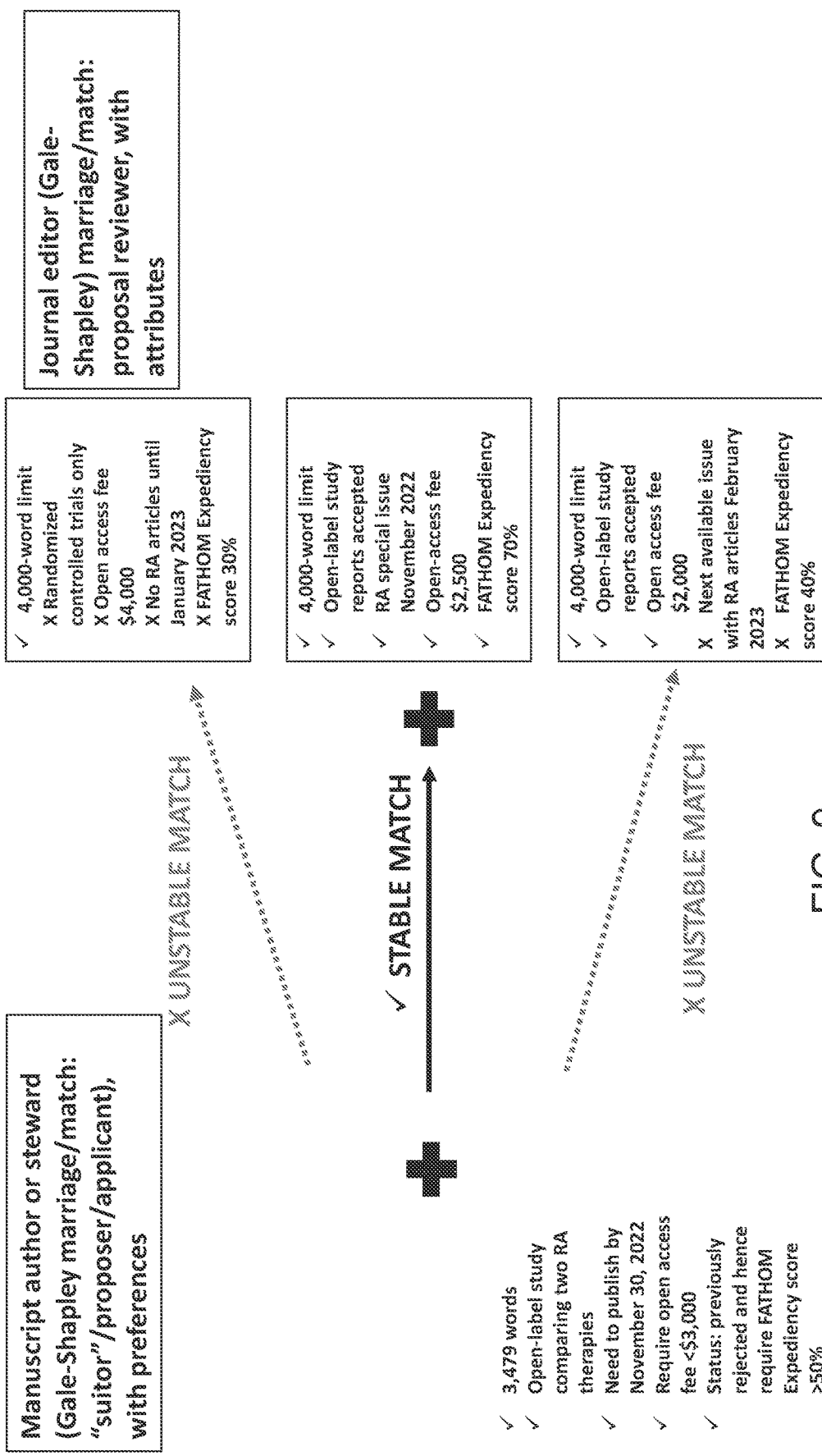
FIG. 9 is an illustration further depicting the DECK WEDDING stable matching function.

As seen in reference to FIG. 9, the DECK WEDDING modeling informs submission of manuscripts to journals using the Gale-Shapley SMP algorithm. Projections of optimal matches are modelled but not binding on any party. Suitors (applicants/"males" in the heterosexual marriage analogy) are KOL/AUTHORS (and stewards of their work [LSC PUBLICATION MANAGERS]), and reviewers of these applications/proposals ("females" in the same marriage analogy) are JOURNAL EDS. One or more needs and preferences of each party are loaded into the Gale-Shapley SMP algorithm.

Likewise, one or more potential needs and preferences of KOL/AUTHORS or LSC PUBLICATION MANAGERS for publication in a certain journal might include some combination of an acceptance rate, a circulation, a regional/geographic scope, an a time from submission to publication (and likely time [financial quarter] of publication), an affiliation of the journal with a professional society, an open access, and an expedited publication.

Other "suitor"/"male" (KOL/AUTHOR and LSC PUBLICATION MANAGER) needs may include benchmarks established by COMPASS FATHOM (score 0 [lowest] to 100% [highest]):

FATHOM Quality according to FATHOM RIPQ rankings (score 0-100%)

FATHOM Efficiency (weights quality over time) (score 0-100%)

FATHOM Expediency (weights both quality over time and acceptance rate; score 0-100%)

Potential needs and preferences of JOURNAL EDS (reviewers/"females" in the heterosexual stable-marriage analogy) for a potential future publication might include:

Evidence levels: Meta-analysis>RCT>observational.

Proximity to market: approved>phase III>phase II>>phase I>>preclinical

Newsworthiness, including recent or impending launch and recent/impending congress presentation, which may drive reader traffic toward and reprint requests from journals One or more RCTs comparing one drug vs. another (rather than vs. placebo/usual care)

RCTs>open-label studies

Open-access or other author amenities for which the journal can charge a per-page fee Excluded manuscripts: subgroup analyses, editorials, and correspondence Manuscripts on more prevalent diseases managed by multiple specialties: such papers drive more traffic and reprint requests vs. a disease managed chiefly by one specialty Highly cited authors (with high ResearchGate score or COMPASS CompScore as logged in within the DECLARATIONS PAGE of ALL ABOARD)

Manuscript quality score based on the COMPASS SCRIMSHAW function and SEMAPHORE SCORE sub-function The DECK WEDDING application may be based on open-source coding from the Comprehensive R Archive Network (https://CRAN.R-project.org/package=matching R); matchingR: Matching Algorithms in R and C++ Version 1.3.0. Authored by Jan Tilly and Nick Janetos (and maintained by Jan Tilly; jantilly@gmail.com), and published on Jan. 26, 2018, the software computes matching algorithms quickly using Rcpp. It implements the Gale-Shapley Algorithm to compute stable matching for two-sided transactions or markets, such as the stable-marriage problem and the college-admissions problem. It also implements Irving's Algorithm for the stable-roommate problem and a trading cycle algorithm for the indivisible-goods-trading problem.

IV. Fathom

As previously indicated, the FATHOM function is a system of ranking journals using a more intuitive, reliable, and user-centric (perspective-specific) approach that does not include the controversial and arguably flawed quality benchmark of impact factor. FATHOM effectively guides KOL/AUTHORS and other researchers in selecting a journal for publication using a ranked system that is more "user intuitive" (assigns journal grades from 0 to 100%) than the prior practice of relying mainly on impact factors (which are known to be flawed). FATHOM encompasses multiple author perspectives, including needs for Quality (first submission of manuscript), Efficiency (quality delivered over time; second submission), and Expediency (efficiency weighted by journal acceptance rate; third or later submission).

FATHOM values different journals based on their properties and the manuscript submission setting, further facilitating matching of manuscripts to journals. This intuitive and user-centric system more comprehensively values journals using ranks of their influence, reach, "cachet (prestige)," time from submission to publication, and other properties (with scores of 0 to 100%) but not impact factor. Ranked data are minimally susceptible to effects of different types of data distributions.

FATHOM is user centric, with scores that reflect perspectives of KOL/AUTHORS or LSC PUBLICATION MANAGERS submitting papers: The rankings may include one or more of the following:

Rete Index of Publication Quality (RIPQ) if journal prestige, influence, and reach are valued highest and time is not a major issue.

Rete Index of Publication Efficiency (RIPE-1) (quality/time) if time is of the essence, such as around an imminent launch or after a single journal rejection.

Rete Index of Publication Expediency (RIPE-2) if both time and acceptance rates are critically important, including in the setting of two or more prior rejections.

FATHOM values are based on wide-ranging, valid measures of journal quality other than impact factor (which is increasingly suspect and can be "gamed" by journals and authors). FATHOM QUALITY includes eigenfactor, article influence score, journal h-index, circulation, affiliation of a journal to one or more professional societies, and duration of publication.

As indicated, FATHOM considers a broad range of factors affecting journal quality, efficiency, and expediency, including prestige ("cachet" or kappa [κ]), influence (iota [I]), and reach (rho [ρ]). Quality, efficiency, and expediency of a journal are closely related to values from other journals in the same therapeutic category by ranks. There is no attempt to compare quality, efficiency, and expediency of journals across (rather than within) therapeutic categories. FATHOM may express each domain (quality, efficiency, and expediency) on an "intuitive" scale of 0 to 100%. Use of ranks renders FATHOM largely immune from adverse effects of skewed or otherwise non-normal distributions. Hence, ratings in each domain of quality, efficiency, and expediency should be consistent with both parametric and nonparametric statistics. An impact factor is not included in calculation of Fathom Quality (RIPQ), EFFICIENCY (RIPE-1), or EXPEDIENCY (RIPE-2).

Fathom Quality (RIPQ)

The Fathom Quality (RIPQ) rating is computed according to the following equation:

$$\text{FATHOM QUALITY (RIPQ)} = i \times \rho \times \kappa$$

Where:

I=iota="Influence" Ascending ranks of journal:
an SJR score=impact and prestige.
an H-Index=productivity and impact.
  Eigenfactor (EGF; salience/"relatedness").
  Article Influence (AI) score.
ρ=rho="Reach." Reach may be determined based on an ascending rank of journal circulation (unique readers of the journal in electronic, "book" [hardcover journal], and open-access embodiments).
κ=Kappa="Cachet." Cachet may be determined based on ascending ranks of a duration of publication (DUR); an Editorial Board International Diversity (EBID; % of all editors from uniquely counted countries_score; and a number of affiliated professional societies (SOC).

Each value is ranked and calculations are based on raw score, divided by the number of journals in category, times 100. As indicated, rankings are ascending, such that, for example, a journal with the highest article influence (AI) score out of 40 journals would receive a rank score of 40 (not 1). Each journal scores of 0 to 100% are based on computed value as a proportion of the total possible score for highest (best) ranks.

In this nonlimiting example, FATHOM QUALITY is computed as follows for an internal-medicine/general-medicine publication category with 23 journals. Each quantity below is divided by 23:

I (iota; influence)=2+ Ascending rank (AR) Eigen factor (EGF)+2+ARH-Index+2+AR Article Influence (AI)
ρ (Rho; Reach)=2+AR Circulation (CIRC)=2+AR citations per document (CITE)
κ (Kappa; cachet)=2+AR SJR (prestige)+1+AR SOC+1+AR duration of publication (DUR)

Using the foregoing. the equation may then be expressed as:

$$\text{FATHOM QUALITY} = $$
$$\left\{\left(2 + \frac{AR\ EGF}{23}\right) + \left(2 + \frac{AR\ H\ \text{index}}{23}\right) + \left(2 + \frac{AR\ AI}{23}\right)\right\} \times$$
$$\left\{\left(2 + \frac{AR\ CIRC}{23}\right) + 2 + \frac{AR\ CITES}{23}\right\} \times$$
$$\left\{\left(2 + \frac{AR\ SJR}{23}\right) + \left(1 + \frac{AR\ SOC}{23}\right) + \left(1 + \frac{AR\ DUR}{23}\right) + \left(1 + \frac{AR\ EBD}{23}\right)\right\}$$

The maximum score for any journal category=9×6×9=486.
FATHOM QUALITY=Journal score÷486.
Fathom Efficiency (RIPE1)
Efficiency is a measure of quality delivered over time. The Fathom Efficiency (RIPE-1) is determined according to the following equations:

$$\text{FATHOM EFFICIENCY (RIPE1)} = \text{FATHOM QUALITY} \div \text{Time.}$$

$$\text{FATHOM QUALITY} = I \times \rho \times \kappa$$

$$\text{FATHOM EFFICIENCY} = I \times \rho \times \kappa / \tau$$

Where T (tau)=time, which is in turn expressed as ascending rank of time from submission to publication ($T_{sub-pub}$):

$$\text{FATHOM EFFICIENCY} = I \times \rho \times \kappa / (2 + AR\ \text{Tsub}-pub)^2$$

The maximum score for EFFICIENCY in a category with 23 journals=486÷(2+1/23)²=116
FATHOM EFFICENCY=(Journal score÷116)×100

Fathom Expediency (RIPE-2). Fathom Expediency is a measure from the perspective of authors who wish to publish their findings in a high-quality, widely read journal, on an urgent timetable for tsub→pub and with the highest likelihood of acceptance. In most cases, a manuscript has been rejected at least twice. FATHOM EXPEDIENCY uses FATHOM EFFICIENCY and multiplies it by α (Alpha; acceptance [ACCEPT]), a weighting factor in which journals with higher acceptance rates receive higher (greater-number) ranks.

$$\text{FATHOM EXPEDIENCY} = \text{FATHOM EFFICIENCY} \times \text{ACCEPTANCE RATE WEIGHT} = (I \times \rho \times \kappa / \tau) \times \alpha$$

Where α (alpha)="acceptance," which is in turn expressed as ascending rank of acceptance rate:

$$\left(2 + \frac{AR\ \text{ACCEPTANCE RATE}}{23}\right)^2$$

The maximum score for EXPEDIENCY in a category with 23 journals=116×(2+23/23)²=1,044
FATHOM EXPEDIENCY=(Journal score÷1,044)×100

V. Scrimshaw

The SCRIMSHAW Editorial Suite, which may be implemented as an add-in to Microsoft Word, or other word processor, digitally "parses" documents to optimize manuscript quality, including consistency within documents and between documents and prespecified (and loaded according to preferences inputted by users in the Log-in function) libraries/databases. This electronic editor "flags" internal and external inconsistencies, including failure to adhere to consensus QC guidelines for manuscript preparation (largely based on checklists in public domain at the EQUATOR website) and JAGS disclosed on journal websites.

SCRIMSHAW can function either (1) proactively, as a real-time KOL/AUTHOR electronic companion that identifies omissions from manuscripts based on preprogrammed consensus QC guideline checklists; or (2) retroactively to score manuscript quality from 0 to 100 and hence facilitate feedback by JOURNAL EDS and LSC PUBLICATION MANAGERS to KOL/AUTHORS and SUPPORTIVE PERSONNEL. SCRIMSHAW also allows comparisons of documents to appropriately loaded dictionaries (e.g. for scientific terminology/nomenclature) and databases for fact checking manuscripts against raw or other original data from a KOL/AUTHOR or LSC PUBLICATION MANAGER team.

Disposition of manuscript submissions by peer-reviewed journals (JOURNAL EDS) is increasingly informed by the extent to which KOL/AUTHORS adhere not only to JAGS and Aims & Scope of the publication but also consensus manuscript-preparation QC guidelines (and checklists) for different types of study reports. These guidelines, which are clearly summarized in checklists of approximately 20 to 30 items (many of which are common across guidelines for different types of study reports) may include the following:

Animal Research: Reporting of In Vivo Experiments (ARRIVE) for preclinical experiments.

CONSORT for RCTs.

Preferred Reporting Items for Systematic Reviews and Meta-analyses (PRISMA) for systematic literature reviews and meta-analyses.

Strengthening the Reporting of Observational Studies (STROBE) for observational studies.

Reporting Recommendations for Tumor Marker Prognostic Studies (REMARK) for biological marker studies.

Standards for Reporting of Diagnostic Accuracy Studies (STARD) for diagnostics studies.

Consolidated Health Economic Evaluation Reporting Standards (CHEERS) for health economics and outcomes research.

These recommendations are written into software code to drive proactive/real-time "correct-while-write" to inform effective manuscript preparation by KOLs/WRITERS or retroactive "correct and score-after-write" to inform LSC PUBLICATION MANAGERS' and JOURNAL EDS' feedback to KOL/AUTHORS and their SUPPORTIVE PERSONNEL (e.g. surrogates such as research fellows, professional medical writers/editors, laboratory personnel).

With the proliferation of manuscript submissions and biomedical journal titles in the past 20 years, there has been a reversion in responsibility for the consistency and overall quality of manuscripts from JOURNAL EDS to authors (KOL/AUTHORS). By automating QC-checking functions, SCRIMSHAW helps to shoulder this burden.

Accordingly, via programmed deterministic rules and gating functions, SCRIMSHAW can flag substantive, rhetorical, and stylistic/formatting defects millions of times faster than a human editor. In addition, human editors and medical spell- and grammar-checkers work on the "substrate" placed before them (e.g., manuscript, text, table): errors of commission. On the other hand, by being programmed with QC checklists for different study types and JAGs for different journals, SCRIMSHAW can more effectively identify missing information: errors of omission. This includes a SCOUT function, which checks and confirms consistent reporting of numerical data (or flags inconsistent reporting).

According to an initial (ENTRY) function of SCRIMSHAW in the ALL-ABOARD DECLARATIONS PAGE LOG-IN BBS, the KOL/AUTHOR indicates which type of study her manuscript is reporting. Doing this triggers SCRIMSHAW to load the appropriate QC checklists, dictionaries, libraries, and other databases to ensure that each "QC box is being ticked" as the writer progresses through the manuscript (when run in real time).

From the ALL-ABOARD DECLARATIONS PAGE, where the user enters the type of study and report (or other manuscript), as well as (if/when known) the journal(s) to which the manuscript will be (or has been) submitted, SCRIMSHAW loads the appropriate dictionaries and "rule sets" from external standards, including JAGS and QC guideline checklists for preparing different types of study reports (available at the public-domain EQUATOR website) and formatting them to specific sets of journals. Although there are thousands of medical journals, their "phenotypes" can be narrowed to a more system-manageable range because certain publishers (e.g. Adis, AMA, Elsevier, Future Medicine, Nature, Springer, Taylor & Francis, Wiley-Blackwell) use similar formatting guidelines for multiple journals within their businesses (or imprints within library/collections).

Guidelines include: 1) Author Instructions, Aims & Scope, and Online Content for each journal, which are typically archived on journal websites; and 2) consensus guidelines for manuscript preparation—including recommendations that are common to different types of manuscripts, such as International Committee of Medical Journal Editors (ICMJE) and Good Publications Practice Panel 3 (GPP3), as well as those corresponding to a specific type of study or analysis being reported, such as CONSORT for RCTs, STROBE for observational studies, and PRISMA for systematic literature reviews and meta-analyses. Consensus manuscript-preparation guidelines are written into the SCRIMSHAW system dictionaries to develop rule sets that drive electronic editing with track changes or other designation, in real time as the KOL/AUTHOR drafts the manuscript, as well as retroactively to inform feedback to authors by JOURNAL EDS and LSC PUBLICATION MANAGERS).

This SCRIMSHAW function is known as "ARCH" because it checks the "architecture" of a study report or outline. For instance, entering the study type "Patient Registry" (an observational study) triggers SCRIMSHAW to load QC guidelines from STROBE for observational studies as well as the particular journal author guidelines and a range of other dictionaries, libraries, and data bases.

Using a search/replace function, the software then searches the manuscript by section (Abstract, Introduction, Results, Discussion, Appendices) and flags any items that are missing per the STROBE (or other guideline) QC checklist. FIG. 13 illustrates a potential embodiment of this electronic feedback: a familiar right-hand margin comment.

Certain other manuscript defects that SCRIMSHAW flags for KOL/AUTHORS relate to general prose style, logic, numbers that are inconsistently expressed in different aspects of the document, nomenclature, and ethical disclosures. Based on a number of errors detected by different SCRIMSHAW functions, the software (via the SCRIMSHAW SEMAPHORE SCORE subfunction) assigns a score from 0 to 100%, which allows reviewers (i.e. LSC PUBLICATION MANAGERS and JOURNAL EDS]) to feed back to KOL/AUTHORS and SUPPORTIVE PERSONNEL in order to specify areas of a manuscript that are in need of further attention and/or remediation.

2. Scrimshaw Scout

SCOUT is a "find-and-flag" toolbar function that enables the computational system to ensure internal consistency by confirming consistent recurrences of unique data (numerical values/digits), as well as identifying divergences in these data, across different aspects of the manuscript, for instance, a value that is presented in the abstract but cannot be identified in Results text or Tables/Figures. For instance, SCOUT might flag an occurrence of the number "10.5" in the Abstract section of the manuscript that does not recur in the Results text, Tables, or Figures, or appears differently in these sections (e.g. as "10.48").

To do so, the SCOUT computational system "parses" the document into smaller constituents and applies prespecified, deterministic rule sets (e.g. two character spaces between sentences [after periods]) and a method to test the rule against the submitted document or its components.

Some of the needed filtering functions of SCOUT are accomplished using XOR gates (Tables A-C).

TABLE A

XOR Gate in SCRIMSHAW SCOUT

| Input | | Output |
|---|---|---|
| A | B | A XOR B |
| 0 | 0 | 0 |
| 0 | 1 | 1 |
| 1 | 0 | 1 |
| 1 | 1 | 0 |

A "true" output (1) results if one, and only one, of the gate inputs is true.

A further example follows. Suppose that, after electronically searching the document for digits, SCRIMSHAW SCOUT identifies the number 27 in the Abstract (page 2) of the manuscript (Table B). Using a prespecified rule set, SCOUT then searches and "parses" other aspects of the manuscript against this value to check for agreement ("internal consistency"). The prespecified rule set is that numerical data in the Abstract must match values in the Results text and Tables but not in manuscript segments largely irrelevant to data presentation (e.g. References/Bibliography).

TABLE B

XOR Gate in SCOUT: Number "27"
Is Identified in Abstract,
and SCOUT Searches Results for Repetition
of This Number in Results Narrative Text*

| Input | | Output |
|---|---|---|
| A (Results text) | B (References/ Bibliography) | A XOR B |
| 27 | 0 | 1 |
| 27 | 27 (e.g. pp 27-37 in a reference citation) | 0 |
| 827 | 27 | 0 |
| 270 | 0 | 0 |
| 0 | 0 | 0 |

*SCRIMSHAW SCOUT proactively flags any number that appears within an early part of manuscript (e.g. Abstract) but is not repeated in later parts (e.g., here, Results text).

TABLE C

XOR Gate in SCOUT: Number "27" Is Identified
in Abstract, and SCOUT Searches Results
for Repetition of This Number in Tables*

| Input | | Output |
|---|---|---|
| A (Results text) | B (Tables) | A XOR B |
| 27 | 27 | 1 |
| 27 | 270 | 0 |
| 827 | 27 | 0 |
| 270 | 0 | 0 |
| 0 | 0 | 0 |

*SCRIMSHAW SCOUT proactively flags (for all users of COMPASS) any number that appears within an early part of the manuscript (e.g. Abstract) but is not repeated in later parts.

3. Scrimshaw "Nomenclater (NOM)."

NOMENCLATER is a find-and-flag or a find-and-query function that checks and promotes external consistency of scientific documents. By activating this toolbar function, the user enables the computational system to compare certain scientific terms within manuscripts against standard, preprogrammed dictionaries/libraries/databases. These include genus species names and common medical abbreviations/acronyms, such as abbreviations of genes, oncogenes, viruses, and chemotherapy regimens.

The NOM function also flags and presents "replace/remedy" options for any abbreviation of, for instance, common genus species names, genes, oncogenes, viruses, and chemotherapy regimens (or other terms) that have not been defined/expanded at their first reference. For instance, if NOM finds the all-capital abbreviation "CHD" on manuscript page 6, it traces previous pages to seek a parenthetical definition at the first reference (e.g. as "coronary heart disease [CHD]") on pages 1 through 5.

Conversely, if NOM identifies frequent use of commonly abbreviated groups of terms throughout the manuscript (e.g. "coronary heart disease" repeated 10 times throughout a 10-page manuscript), it offers users (as a find/flag or find/remedy option) the alternative of abbreviating the phrase as "CHD," after definition at the first reference.

Similarly, if NOM finds the genus species name "*S aureus*" on the top of page 7, it will seek its first use and definition [as "*Staphylococcus aureus* (*S aureus*)"] on pages 1 through 6. On the other hand, if NOM finds multiple instances of *Staphylococcus aureus*, it will offer users (as a find/flag or find/remedy option) the alternative of abbreviating the phrase as *S aureus* after definition at the first reference [i.e. *Staphylococcus aureus* [*S aureus*]). The NOM function also finds/flags or finds/remedies improper uses of fonts (roman or italics) for certain terms. Examples include "*S aureus*" (which should be italicized) or staphylococci (which should remain Roman). Abbreviated or other gene names (e.g. EGFR) should be italicized.

By applying XOR gates, the NOM function does not flag other, permissible uses, including "*S aureus*" (Roman) appearing in a bibliographic reference, which represents a permissible exception.

4. Scrimshaw Logix (LGX).

LOGIX is a "find-and-flag" or find-and-query function. By activating this toolbar function, the user enables the computational system to check paragraphs for a cogent flow of ideas. The LGX function accomplishes this by comparing each paragraph with the key words (LINKING TERMS) entered in the manuscript (page 2) and/or the ALL ABOARD DECLARATIONS PAGE. Either proactively as the manuscript is being drafted, or retroactively after scanning through a completed draft, LGX finds and flags, as potentially tangential, any paragraphs that do not contain the LINKING TERMS.

LGX also compares the manuscript against rule sets driven by QC guidelines (e.g. at the EQUATOR website) such as "Include the word 'objective*,' 'aim*,' or 'purpose*' within the Introduction" section of the manuscript (FIG. 13); or "Include the words 'conclusion*' or 'summary,' as well as 'limitation,*' within the Discussion section."

LGX also compares manuscripts against preprogrammed rule sets/dictionaries/libraries/databases to minimize errors of diction (e.g. dehumanizing, jargon, other objectionable usages), syntax, spelling, punctuation, hyphenation, wordy or redundant expressions, and other potential defects, such as subject-predicate disagreement, inconsistent verb tense, and hyphenating an "ly" adverbial construction. These are identified by a find/flag or find/remedy function of LGX.

5. Scrimshaw Abacus (ABX/#)

ABACUS is a "find/flag" or "find/remedy" function. By activating this COMPASS toolbar function, the user enables the computational system to complete simple calculations, for instance, summing lists of percentages in tables and finding/flagging or finding/remedying any percentages that do not sum to 100.

The computational system also searches the document for units of measure and, referring to preprogrammed conversion factors, indicates Standard International or English (e.g. mg/dL) units within parentheses after the first instance of the numerical expression.

ABX/# ensures that all numbered references, tables, and figures are identified (i.e. "called out") in correct sequence in the text (e.g. Table 1 is followed by Table 2, then Table 3, and not some other sequence; reference 1 is followed by 2, and then 3 [or e.g. 3-8], and not some other sequence).

ABX also counts (and potentially designates/indicates, via a margin comment box) numbers of characters in the title and running title, words in the Abstract and text, as well as tables, figures, and references, and then charts these into a small table on the title page or page 2. Based on the journal target designated by the author in the ALL ABOARD LOG-IN DECLARATIONS PAGE, and a preprogrammed database of JAGs, ABX/# finds/flags any manuscript components that exceed journal's maximum values (e.g. "Abstract=252/250 words").

6. SCRIMSHAW ARCHITECT (ARCH) is a find/flag and find/remedy (i.e. "find/scaffold") functions. By activating this toolbar function, the user enables the computational system to compare the document to QC checklists of manuscript components required by public-domain consensus guidelines for manuscript preparation (e.g. required-component QC checklists available at the EQUATOR website). The consensus QC guideline/checklist to which ARCH refers is determined when the user enters the study design in the USER ENTRY step/function (i.e. ALL ABOARD LOG-IN DECLARATIONS PAGE).

For instance, if the user specifies "randomized controlled trial" in the ALL ABOARD LOG-IN DECLARATIONS PAGE, within a "Study Design" section, ARCH loads the public-domain CONSORT QC checklist and compares the manuscript to the items on this checklist, which include required headings/titles and other constituents. Using a find/flag utility, the computational system can prompt the user to provide these items in a proactive, real-time manner.

Any manuscript that reports an RCT and does not include a CONSORT patient-disposition flowchart receives (from ARCH) a template within the Figures section of the manuscript to be populated by the user. The structure of this flowchart is determined by the user's responses about study design (including number of treatment groups and endpoints) within the ALL ABOARD LOG-IN DECLARATIONS PAGE. If absent, similar types of flowchart templates are introduced into a study report manuscript for a systematic literature review or meta-analysis, according to the PRISMA guidelines (also available at the EQUATOR website; http://www.equator-network.org/reporting-guidelines/prisma/).

7. Scrimshaw Ethics (ETHX)

ETHX includes a "find-and-query" and a "find-and-scaffold" function. By activating this toolbar function, the user enables the computational system to compare the document to 1) checklists/text related to ethics in human experimentation; and 2) ICMJE author disclosure documents entered within the ALL ABOARD LOG-IN DECLARATIONS PAGE user entry step/function. For instance, ETHX flags any RCT or other clinical trial that does not reference the Declaration of Helsinki (with iteration/verbiage influenced by study dates), Clinicaltrials.gov NCT #s where applicable, and other associated medical-ethics language related to written informed consent and institutional review.

ETHX also compares the document to author documents loaded by the user during the ALL ABOARD LOG-IN DECLARATIONS PAGE user entry step/function, to ensure that the necessary disclosures are included in the manuscript. These include "fillable pdf" files of ICMJE financial-disclosure forms.

As with the ARCH function, ETHX finds/flags any disclosure information contained within the documents, loaded via the ALL ABOARD LOG-IN DECLARATIONS PAGE, that does not appear in the manuscript. This information may include: 1) identities/roles of the study funding entity, including industry, government, and academic institutions; 2) author financial disclosures; 3) intellectual contributions made by each researcher to meet ICMJE authorship thresholds; and 4) identities of any contributors whose work did not meet ICMJE authorship thresholds but who need to be acknowledged (e.g. SUPPORTIVE PERSONNEL such as research fellows, laboratory personnel, professional medical writers and editors, computer graphics professionals, and presubmission peer reviewers).

8. Scrimshaw Scrimshander.

SCRIMSHANDER is also a find/flag or find/remedy toolbar function. By activating it, the user enables the computational system to compare a document's formatting and other style items to the requirements of a particular journal (as loaded by SCRIMSHAW from appropriate journal Author Guidelines), whose identity is specified during the ALL ABOARD LOG-IN DECLARATIONS PAGE user entry step/function. Journal author guidelines (JAGS) databases can also be loaded by SCRIMSHANDER after the matching processes (LONGITUDE, DECK WEDDING, FATHOM) identify the most suitable target journal.

By the aforementioned parsing and deterministic-rule applications, SCRIMSHANDER compares manuscript elements to the journal's Author guidelines (JAGS) and online content, including the title, running title, corresponding-author address, abstract, key words, list of abbreviations, text headings, references (e.g. checking journal abbreviations vs. Index Medicus database and finding/flagging single-page references), and Tables and Figures, including proper, journal-specified uses of letters or symbols for footnotes and also including a footnoted test name associated with each p value for statistical significance (e.g. Student's paired t test, $X^2$).

Potential additional functions within SCRIMSHANDER may include (possibly using open-source Tesseract OCR) comparisons of: 1) page proofs/galleys (as Word or pdf files) to final manuscripts (typically as Microsoft Word files; i.e. proofreading function); 2) numerical data in Tables and Figures of manuscripts to raw data table outputs (e.g. .xlsx files) from biostatisticians; and 3) numerical data cited in the Introduction and Discussion of the manuscript to numbers found in linked published references uploaded during the ALL ABOARD DECLARATIONS PAGE user entry step/function (i.e. fact-check function).

9. Scrimshaw Semaphore/Score

SEMAPHORE/SCORE is the COMPASS manuscript-evaluation/QC-checking function that sums scores of each of the SCRIMSHAW domains in order to yield a total score ranging from 0 (lowest quality) to 100% (highest quality).

These scores are based on relative internal consistency and divergences of manuscripts from key requirements/dictionaries/libraries/other databases.

The SEMAPHORE SCORE function supports quality-promoting activities of JOURNAL EDS and LSC PUBLICATION MANAGERS, who need to feed back to KOL/AUTHORS and SUPPORTIVE PERSONNEL concerning the quality of their outputs. At this writing, there is no electronic software that accomplishes this aim in an objective, quantifiable manner that is also intuitive (i.e. scored from 0 to 100).

There is no inherent sequence to the COMPASS functions. Most are intended for use by KOL/AUTHORS, JOURNAL EDS, and LSC PUBLICATION MANAGERS. The functions are generally organized from project start, including "matching," via LONGITUDE, DECK WEDDING, and FATHOM to promote more effective assignment of KOL/AUTHOR and LSC PUBLICATION MANAGER content to PRJs (and potentially other) communications portals; and "dispatching," via SCRIMSHAW, which proactively (i.e. in real time) or retroactively parses the document and optimizes its quality, minimizing errors of both omission and commission. However, users will be free to select and use any function (without including the others) to enhance their outputs and the likelihood of successful submissions.

The system of the present invention may include at least one computer with a user interface. The device may include any computer including, but not limited to, a desktop, laptop, and smart device, such as a tablet or smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may also access the software via the web browser using the internet, extranet, intranet, host server, internet cloud, and the like.

The computer-based data processing system and method described above is for purposes of example only, and may be implemented in any type of computer system or programming or processing environment, or in a computer program, alone or in conjunction with hardware. The present invention may also be implemented in software stored on a nontransitory computer-readable medium and executed as a computer program on a general purpose or special purpose computer. For clarity, only aspects of the system that are germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system or from a server computer system that can be accessed by a plurality of client computer systems interconnected over an intranet network, or that is accessible to clients over the Internet. In addition, many embodiments of the present invention have application to a wide range of industries. To the extent that the present application discloses a system, the method implemented by that system, as well as software stored on a computer-readable medium and executed as a computer program to perform the method on a general purpose or special purpose computer, these details are within the scope of the present invention. Further, to the extent that the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of matching a manuscript with a publisher, comprising:
a computer having a user interface; and
a program product comprising machine-readable program code for causing, when executed, the computer to perform the following process steps:
receiving a manuscript submission from an author and one or more author needs and preferences for a target publication for the manuscript,
anonymizing the manuscript to remove identifying indicia of an identity or a source of the manuscript;
receiving a manuscript requirement from a publisher of a journal, the manuscript requirement specifying one or more potential and preferences for a desired manuscript for publication in the journal;
anonymizing the manuscript requirement to remove identifying indicia of an identity of each of the publisher and the journal; and
matching the manuscript submission with the manuscript requirement according to a Gale Shapley stable-matching algorithm that drives a nonbinding modelling of a suitable journal for a manuscript submission.

2. The method of claim 1, further comprising:
hosting a bulletin board service (BBS) to remotely connect a matched manuscript with a matched manuscript requirement, the BBS having an initial configuration in which each of the matched manuscripts and a matched journal remain anonymized until a peer review of a selected manuscript is completed.

3. The method of claim 2, further comprising:
accessing, via the BBS, the matched manuscript by the publisher of the matched manuscript requirement.

4. The method of claim 2, further comprising:
selecting, via the BBS, the matched manuscript for the matched manuscript requirement.

5. The method of claim 2,
accessing, via the BBS, a matched publisher by the author of the matched manuscript.

6. The method of claim 5, further comprising:
selecting, via the BBS, the matched manuscript requirement by the author of the matched manuscript.

7. The method of claim 2, wherein the matching identifies only a stable match between the manuscript submission and the manuscript requirement.

8. The method of claim 2, wherein the BBS is configured to receive the manuscript requirement from the publisher.

9. The method of claim 2, further comprising:
ranking the journal according to a Rete Index of Publication Quality (RIPQ); and
presenting, via the BBS, the RIPQ with the matching manuscript requirement.

10. The method of claim 2, further comprising:
ranking the journal according to a Rete Index of Publication Efficiency (RIPE-1); and
presenting, via the BBS, the RIPE-1 with the matching manuscript requirement.

11. The method of claim 2, further comprising:
ranking the journal according to a Rete Index of Publication Expediency (RIPE-2); and
presenting, via the BBS, the RIPE-2 with the matching manuscript requirement.

12. The method of claim 2, wherein the BBS is configured to receive the manuscript submission from the author.

13. The method of claim 2, further comprising:
parsing the manuscript submission for compliance to a selected quality control (QC) consensus guideline associated with a study type reported by the manuscript submission.

14. The method of claim 13, further comprising:
flagging the manuscript submission with errors of commission in conforming the manuscript submission with the selected QC consensus guideline.

15. The method of claim 13, further comprising:
flagging the manuscript submission with errors of omission in conforming the manuscript submission with the selected QC consensus guideline.

16. The method of claim 13, further comprising:
scoring the manuscript submission according to the selected QC consensus guideline.

17. The method of claim 13, further comprising:
determining an internal consistency for each instance of a unique numerical data element within the manuscript submission; and
flagging a divergence of the unique numerical data element between a plurality of sections of the manuscript submission.

18. The method of claim 17, wherein the plurality of sections of the manuscript submission is selected from the group consisting of and abstract, a body, a table, a figure, or a result.

* * * * *